United States Patent [19]

Kallenbach et al.

[11] Patent Number: 5,267,161
[45] Date of Patent: Nov. 30, 1993

[54] SYSTEM FOR THE GENERATION OF SIGNALS FOR CONTROL OR REGULATION OF AN UNDERCARRIAGE CONTROLLABLE OR REGULABLE IN ITS SEQUENCES OF MOTION

[75] Inventors: Rainer Kallenbach, Stuttgart; Udo Neumann, Leonberg; Stefan Otterbein, Stuttgart, all of Fed. Rep. of Germany

[73] Assignee: Robert Bosch GmbH, Stuttgart, Fed. Rep. of Germany

[21] Appl. No.: 679,297

[22] Filed: Apr. 2, 1991

[30] Foreign Application Priority Data

Apr. 12, 1990 [DE] Fed. Rep. of Germany ....... 4011808
Mar. 6, 1991 [DE] Fed. Rep. of Germany ....... 4107090

[51] Int. Cl.⁵ ............................................. B60G 17/00
[52] U.S. Cl. ........................... 364/424.05; 364/424.01; 280/707
[58] Field of Search ............ 364/424.01, 424.05; 280/707

[56] References Cited

U.S. PATENT DOCUMENTS

| | | | |
|---|---|---|---|
| 4,916,632 | 4/1990 | Doi et al. | 364/508 |
| 5,044,660 | 9/1991 | Yamamura et al. | 280/707 |
| 5,053,965 | 10/1991 | Fujimura et al. | 364/424.05 |
| 5,058,017 | 10/1991 | Adachi et al. | 364/424.05 |
| 5,103,396 | 4/1992 | Hiwatashi et al. | 364/424.05 |
| 5,138,556 | 8/1992 | Yoshino | 364/426.02 |

FOREIGN PATENT DOCUMENTS 3827737 9/1989 Fed. Rep. of Germany .

Primary Examiner—Thomas G. Black
Assistant Examiner—Tan Q. Nguyen
Attorney, Agent, or Firm—Baker & Daniels

[57] ABSTRACT

A system for inferring actual wheel load fluctuation based on signals representing the relative movements between the wheel units and the vehicle body. Possible changes of the actual wheel load fluctuation are precalculated as a function of a possible change of the undercarriage characteristic, whereupon by scanning of certain criteria a determination is made as to whether a situation critical to road safety is given and whether in the case of a situation critical to the road safety the undercarriage characteristic is to be adjusted for minimization of the wheel load fluctuations.

17 Claims, 5 Drawing Sheets

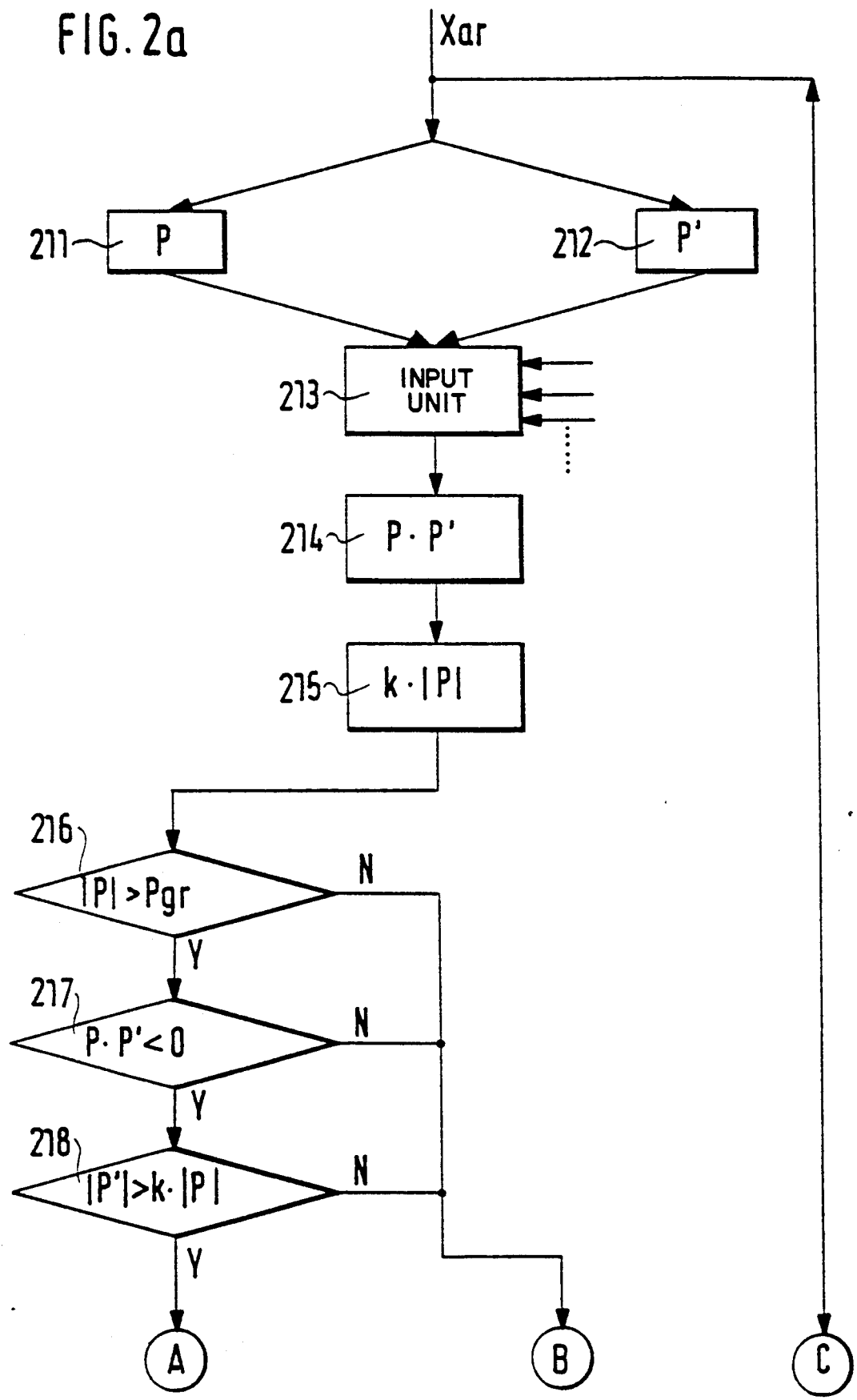

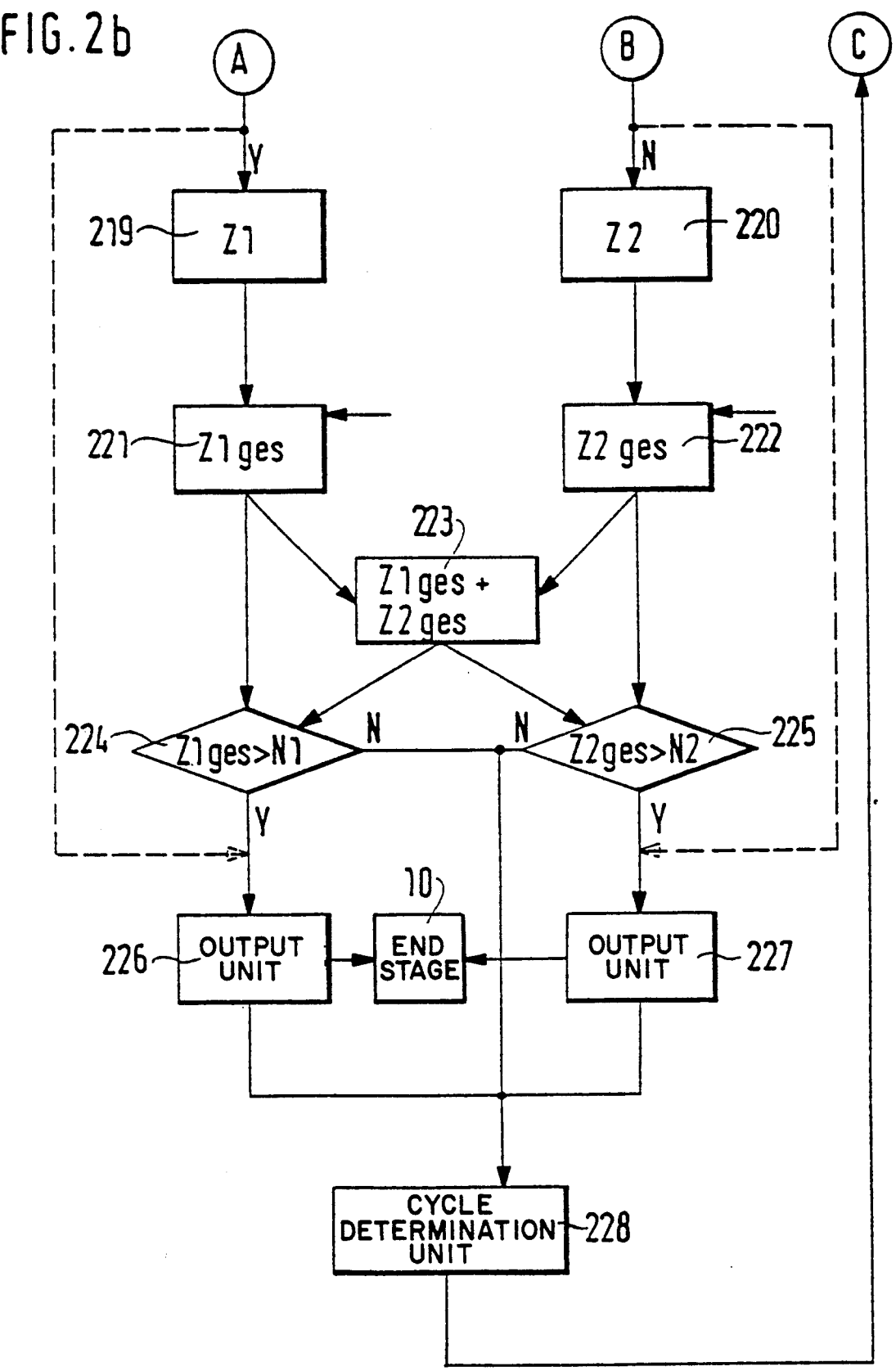

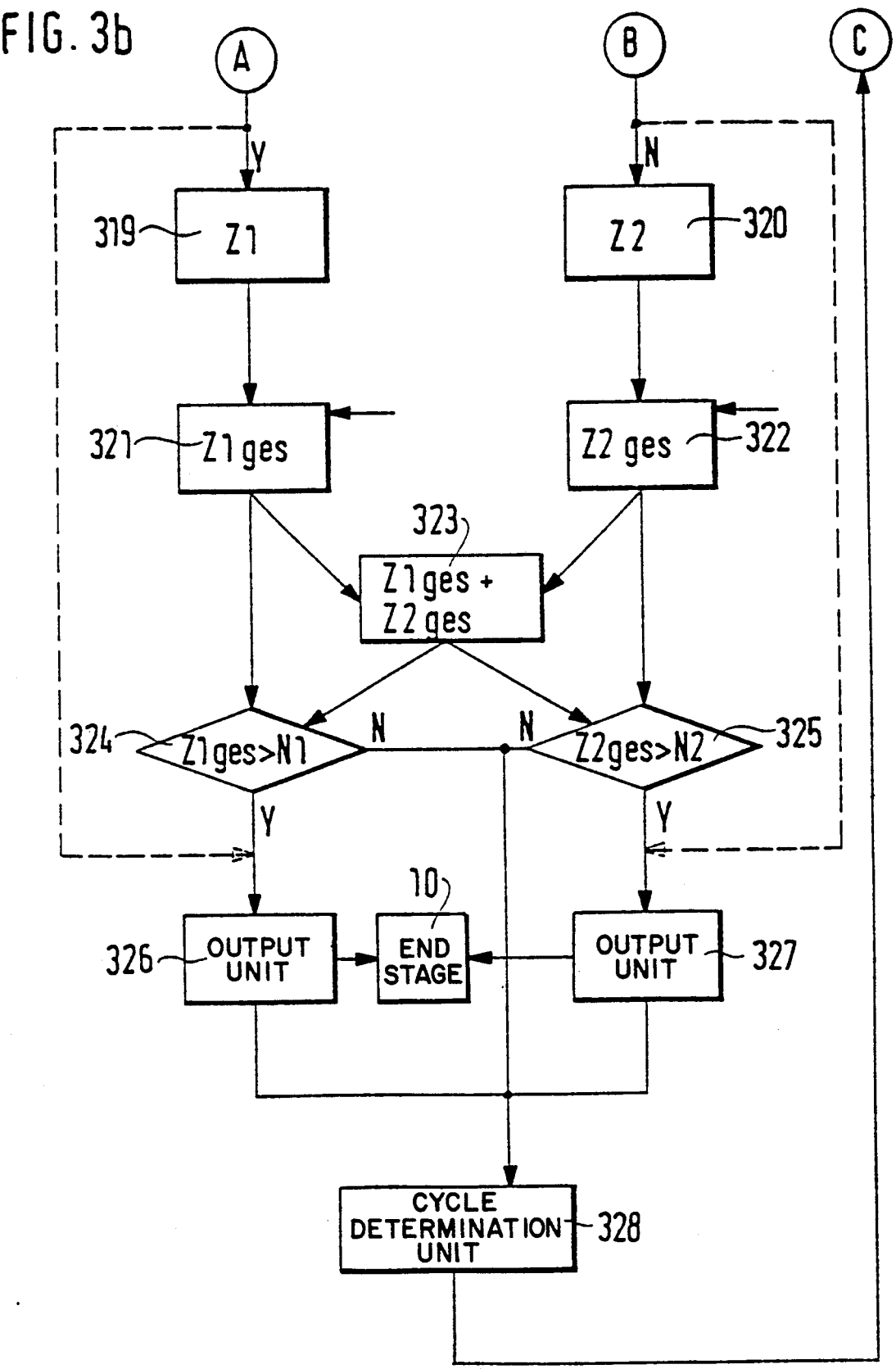

SYSTEM FOR THE GENERATION OF SIGNALS FOR CONTROL OR REGULATION OF AN UNDERCARRIAGE CONTROLLABLE OR REGULABLE IN ITS SEQUENCES OF MOTION

BACKGROUND OF THE INVENTION

This invention relates to a system for generating signals for the control or regulation of an automotive undercarriage.

Essential for the design of an automotive undercarriage is an efficient suspension and/or damping system. To be taken into account here, for one, is road safety while for another it is desirable to afford the passengers and a shock-sensitive cargo of the vehicle a maximally high travel comfort. From the vantage point of the suspension and/or damping system, these are contradictory objectives. High travel comfort is achieved through a maximally soft undercarriage adjustment, whereas with regard to road safety a maximally hard undercarriage adjustment is desirable.

To resolve this conflict in objectives, a switch is made from the passive undercarriages as largely used in the prior art to controlled (active) undercarriages. Depending on the predicted use of the vehicle, a passive undercarriage is designed either relatively hard ("sporty") or relatively soft ("comfortable") when installed. The characteristic of the undercarriage during the operation of the vehicle can not be influenced with these systems. In the case of active undercarriages, in contrast, the characteristic of the spring and/or damping system can be influenced during road operation, depending on driving conditions.

In the German patent disclosure 38 27 737 the aforementioned conflict in objectives between road safety and driving comfort is solved in that an active or switchable undercarriage is at varying operating conditions, for instance changing road surface conditions, so controlled under variation of the travel comfort that the road safety is always assured. Utilized as an evaluation criterion for the road safety is the effective value of the wheel load fluctuations during road operation. Wheel load fluctuation is understood as the variation of the wheel load (normal force between tire and road surface) from its static value. The wheel load fluctuation (as also the wheel load itself), however, is accessible to direct measurement only with great difficulty, since sensors would need to be arranged between the wheel or the tire and the road surface. In contrast, the measurement of the spring travel is relatively simple and cost-effective to realize. Termed spring travel is the relative displacement of the vehicle body relative to the wheel. According to DE-OS 38 27 737, the spring travel is measured as a substitute variable for the wheel load fluctuation. Derived from these measured values are the sliding effective value and the sliding average for the substitute variable as well as their difference. Once this difference has been compared with a predetermined set value, exceeding this set value causes the issuance of an electrical display and/or control signal for control/regulation of the undercarriage.

The problem underlying the present inventional system, basing on signals which represent the relative movements between vehicle body and the wheels, is to generate on the basis of more differentiated evaluation criteria control signals for an adjustable undercarriage in order to, as the case may be, effectively increase the road safety.

SUMMARY OF THE INVENTION

The present invention overcomes the disadvantages of the above prior art systems by providing an improved system therefor. The system according to the present invention generates signals for control or regulation of an undercarriage of a passenger and/or utility motor vehicle, which in its sequences of motion is controllable or regulable. The vehicle has at least two wheel units and suspension systems between the vehicle body and wheel units which can influence the movements between the wheel unit and vehicle body. Signals are determined which represent the relative movements between the wheel units and the body of the vehicle (spring deflection movements). Based on these signals an inference is made of the wheel load fluctuation (P). Possible changes (P') of the wheel load fluctuation (P) are precalculated as a function of possible changes of the undercarriage characteristic. By scanning of certain criteria a determination is made as to whether a situation critical to road safety exists and whether in the case of a situation critical to road safety the undercarriage characteristic is to be adjusted for minimization of the wheel load fluctuations.

Thus, based on signals representing the relative movements between the wheel units and the vehicle body, the inventional system infers the wheel load fluctuations.

Moreover, possible changes of the wheel load fluctuations are precalculated as a function of a possible change of the undercarriage characteristic, whereupon by scanning of certain criteria a determination is made as to whether a situation critical to road safety is on hand and whether in the case of a situation critical to road safety the undercarriage characteristic is to be adjusted in order to minimize the wheel load fluctuations.

Thus, the inventional system not only determines a substitute variable for the wheel load fluctuation, but the wheel load fluctuation itself is utilized for control/regulation of the undercarriage. Moreover, the change of the wheel load fluctuation due to a modification of the undercarriage tuning is taken into account. This results in a more differentiated decision as to whether a change of the undercarriage characteristic meets the objective of road safety optimization while at the same time providing maximum comfort. In this respect, the design of the inventional device is such that road safety is given greater priority than travel comfort. Owing to the more differentiated decision regarding the modification of the undercarriage tuning, fewer switching pulses by far are transmitted to the regulable suspension and/or damping system. This increases, for one, the service life of the system and, for another, improves the road safety and travel comfort, since another characteristic is adjusted only if such contributes to increasing the road safety or is absolutely necessary.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2a, 2b, 3a, 3b show the system of FIG. 1 in more detail.

Figure 1:
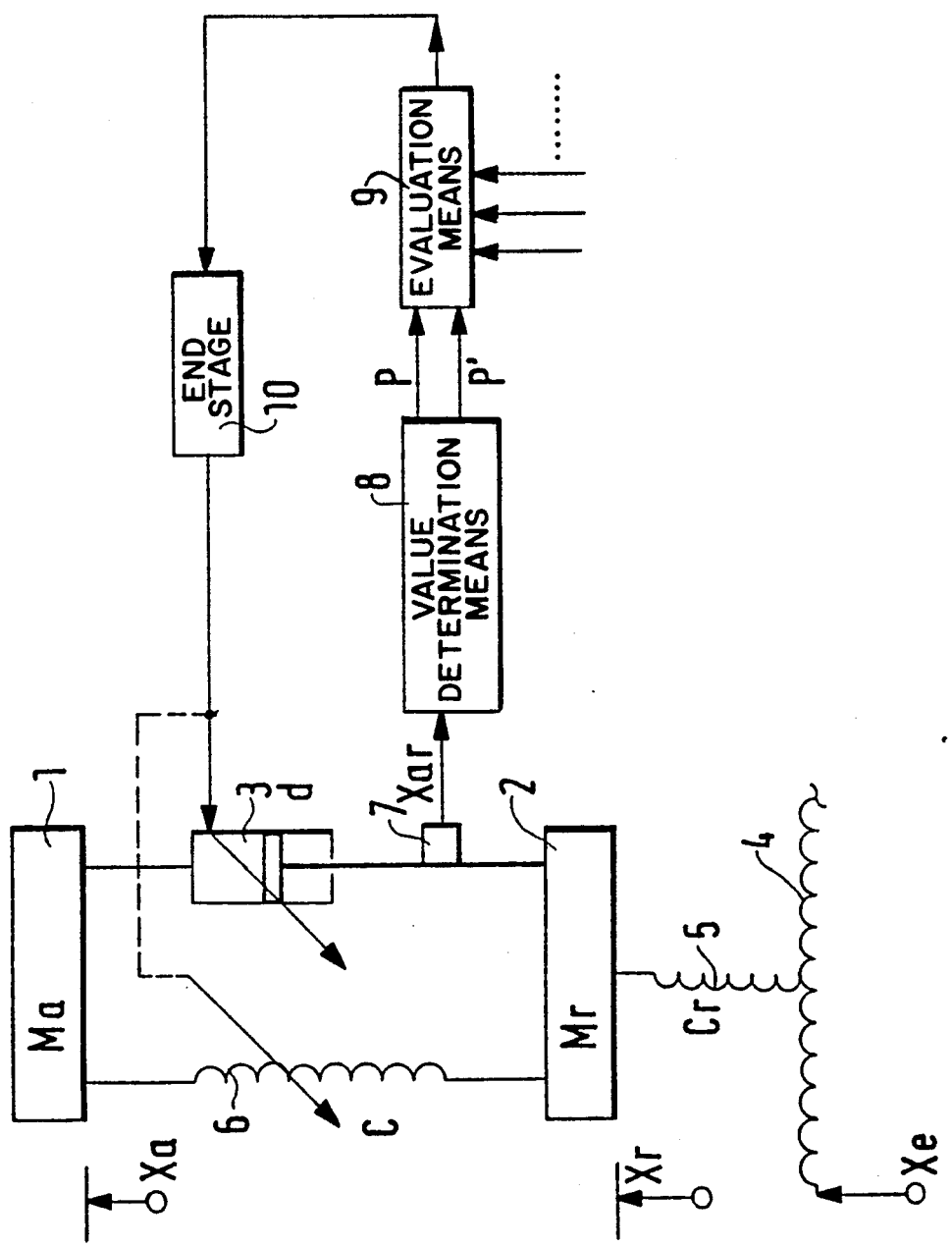
FIG. 1 is a schematic block diagram of the system according to the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

In this embodiment, the inventional device for a suspension and/or damping system will be illustrated with the aid of a block diagram.

FIG. 1 shows the control/regulation system for a wheel unit in the embodiment. Marked 1 is the vehicle body with the proportional mass Ma, while 2 represents the wheel with the proportional wheel mass Mr, and 5 a spring with the spring constant Cr. The road surface is marked 4. An absorber 3 with the damping constant d represents with its spring 6 of parallel arrangement (spring constant C) the undercarriage to be controlled/regulated. The absorber 3 and/or the spring 6 have a regulable design. Sensor 7 (labeled S in FIG. 1) senses the spring deflection movements. Reference 8 represents means for the value determination, while 9 stands for means serving the evaluation of values, and 10 is an end stage. Variables Pgr, k, V, Al, Aq, T, N1, N2, Tr . . . are transmitted to the means for evaluation of variables.

Figure 3A:
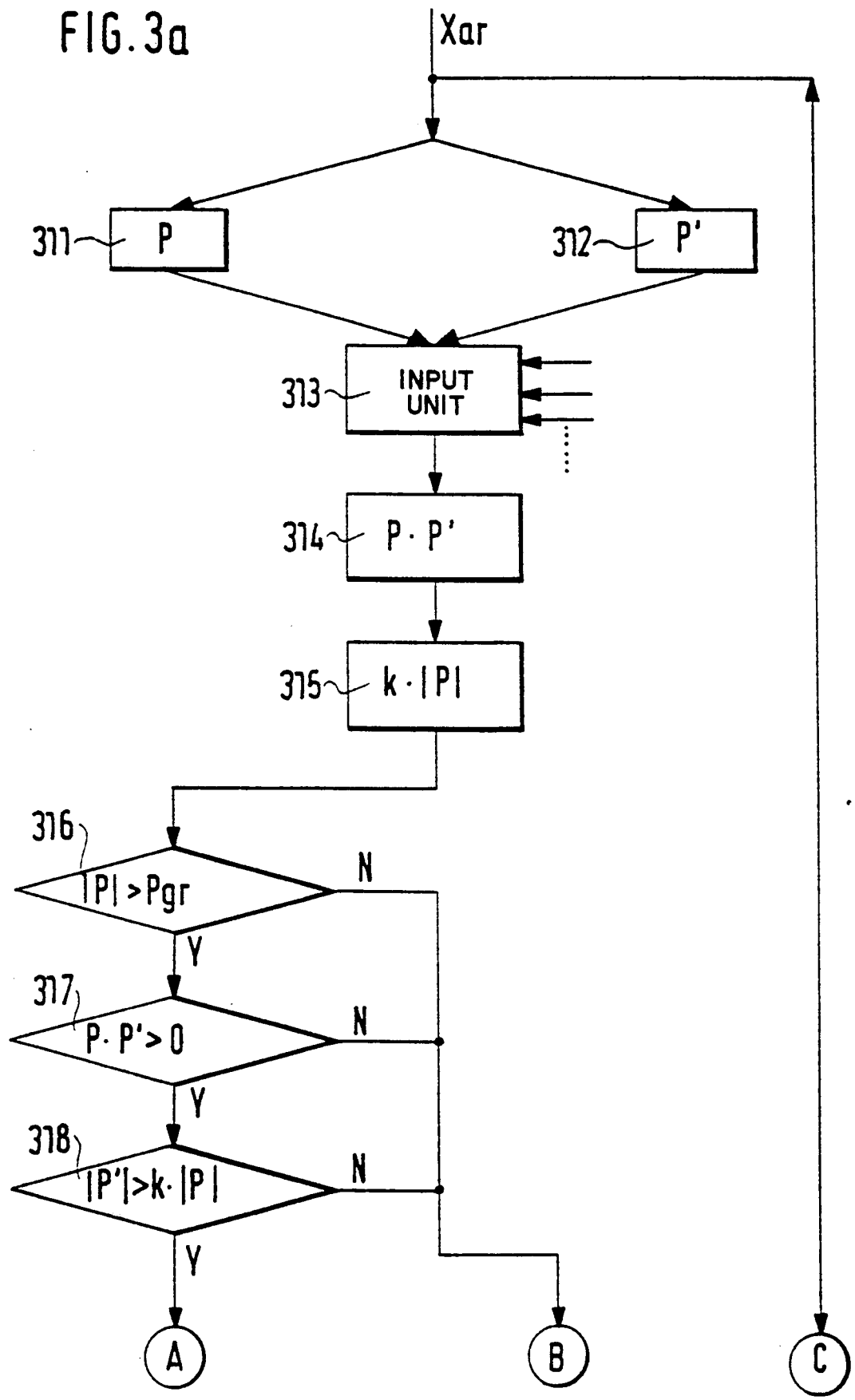

References 1, 2, 3, 4, 5 and 6 in FIG. 1 indicate a two-body model for a wheel unit. The wheel is in contact with the road surface 4. In this context, the tire stiffness is in model fashion described as spring 5 with the spring constant Cr. In this embodiment, the absorber 3 is assumed to be regulable, whereas the properties of the spring 6 are described by a constant value C. The fact that the spring 6 may also be designed regulable is indicated in FIG. 1 by the dashed line. The combination of the spring 6 and the absorber 3 regulable with regard to its damping properties, thus, stands here for the suspension and/or damping system of a wheel unit that is to be controlled/regulated. Marked Xa or Xr is the displacement of the vehicle body or the displacement of the wheel, respectively, and at that, the displacement from the position of equilibrium at vehicle standstill (in no-load condition). Xa describes the unevennesses of the road surface. The sensor 7 detects the spring deflection movements of the wheel unit. In this embodiment, the spring travel Xa-Xr is assumed as measuring variable, while just as well the relative velocity Xa'-Xr' or the relative acceleration Xa''-Xr'' could be measured though. The lines between the symbols mean time derivations. The signal of the spring deflection movements is transmitted to means 8 for value determination. As output signals, the wheel load fluctuation P and its sensitivity P' are present across the unit marked 8. These variables will be more fully explained farther down, in the description of FIG. 2. In the means 9 for evaluation of values, the variables P and P' are linked and compared with one another and/or with variables to be read in, and the results of the comparisons are transmitted to counting units. Transmitted to the means 9 for value evaluation, additionally, are undercarriage tuning parameters such as Pgr, k, road condition variables such as travel speed V, lengthwise and transverse vehicle acceleration Al and Aq, ambient temperature T, counter coordination parameters such as set values N1 and N2, reset time Tr . . . As an output signal of the means 9 a control signal is transmitted to the end stage 10, where the changeover of the suspension and/or damping characteristic of the controlled/regulated suspension or damping system is initiated by a respective actuator activation. FIGS. 2 and 3 illustrate in more detail the mode of operation of the means 8 for value determination and of the means 9 for value assessment. Marked 211, 311, 212 and 312 are electronic filter units and/or computer units. Multiplier units are marked 214, 214, 215 and 315, while input units for read-in parameters are marked 213 and 313. Discriminators are indicated by 216, 316, 217, 317, 218 and 318. Signified 219, 319, 220 and 320 are means for making counting signals available. The references 221, 321, 222, and 322 represent counting units, while 223 and 323 indicate adders and 224, 324, 225 and 325 discriminators. The output units 226, 326, 227 and 327 generate control signals that are passed on to the end stage 10 (FIG. 1). Marked 228 and 328 is a unit for determination of the next computation cycle.

In the framework of the description of FIGS. 2 and 3, the means 8 and 9 of FIG. 1 and the physical background of the inventional device shall be addressed. Signified as wheel load fluctuation P is the deviation of the wheel load (normal force between tire and road surface) from its static value. While it, and possibly also the tire deflection travel, which is directly linked to the wheel load fluctuation, is accessible to measurement only with great difficulty, for instance a spring deflection travel Xa-Xr can be sensed with relatively simple and thus low-cost sensors. In vehicles with a level regulation, as the case may be, an already existing sensor can be utilized for determination of the spring travel. The two-body model addressed above allows the deduction that the sought variable P correlates as follows with the spring deflection movement:

$$P = -[(1+Mr/Ma)*C + (1+Mr/Ma)*d*s + Mr*s^2] * Xar, \quad (1)$$

where s is the Laplace variable. Signified Xar is the so-called "deaveraged" spring travel, which by subtraction of its current average $$1/Tm * \int_{t-Tm}^{t} [Xa(r) - Xr(r)]dr\} \quad (2)$$

derives from the measured variable Xa-Xr as $$Xar(t) = \{Xa(t) - Xr(t)\} - \left\{1/Tm * \int_{t-Tm}^{t} [Xa(r) - Xr(r)]dr\right\} \quad (3)$$

Here, Tm is a tuning parameter and t the actual point in time. Eliminated by this "deaveraging" of the spring travel Xa-Xr is both the influence of a vehicle loading, i.e., a change of the static spring travel, and also the influence of asymmetric (with regard to the pressure and traction range) spring and/or absorber parameters (change of the average dynamic spring travel) upon the calculation of the wheel load fluctuation.

Moreover, using the aforementioned two-body model leads to the relation $$P' = \partial P/\partial d = -[(Ma^* Cr^* s^3)/D(s)]^* Xar, \quad (4)$$

between the sensitivity P' (regarding the damping constant d) and the "deaveraged" spring deflection travel Xar with the abbreviation $$D(s) = C^* Cr + Cr^* d^* s + (C^* Mr + (C + Cr)^* Ma)^* s^2 + (Ma + Mr)^* d^* s^3 + Ma^* Mr^* s^4 \quad (5).$$

This value P' is a measure for the change of the wheel load fluctuation P when the damping constant d of the damping system to be controlled/regulated is modified. Specifically, the mathematical sign of P' provides an information as to whether the wheel load fluctuation P is increased or reduced by a change of the damping constant d of the damping system to be controlled/regulated. Since the optimization of road safety is associated with the minimization of the variable |P|, the information (4) on the sensitivity P' of the variable P is an important decision criterion as regards a control/regulation of a damping system. In the general case, the sensitivity P' is defined as the derivation of the wheel load fluctuation P after a "characteristic" undercarriage parameter. The latter is characterized in that different parameter values describe different undercarriage tunings. In a controlled/regulated suspension system this parameter, e.g., might have the physical meaning of a spring stiffness. In this case, the sensitivity P' (as regards the spring stiffness C) is $$P' = \partial P/\partial C = -[(Ma^* Cr^* s^2)/D(s)] \cdot Xar, \quad (6)$$

where D(s) is given also here by the equation (5).

The values of the model parameters (Ma, Mr, C, Cr and d) are either known or can be determined, for instance by parameter identification methods, for a specific vehicle whose undercarriage is to be controlled/regulated.

Present on the input of the means 8 for value determination, or the electronic filter units and/or computer units 11 and 12 are the signals of the "deaveraged" spring travel Xar. The computation of the current average according to equation (2) as well as its subtraction from the measured value Xa-Xr according to equation (3) may take place, e.g., in the evaluation electronics of the sensor 7.

The units 11 and 12 may be realized by digital electronics, for instance by processing a differential equation representing the transfer properties (equation 1, 4 or 6) in computer units, or in analogue electronic fashion, for instance by imitation of a differential equation representing the transfer properties (equation 1, 4 or 6), with electronic components.

When instead of a spring travel sensor using a transducer that captures the relative velocity Xa'-Xr' or the relative acceleration Xa''-Xr'', the expressions in square brackets in the formulas (1), (4), and (6) to the right of the equal sign are to be divided by the Laplace variable s (in the case of determining the relative velocity Xa'-Xr') and $s^2$ (in the case of determining the relative velocity Xa''-Xr''). The "deaveraging" of the measured variable Xa'-Xr', or Xa''-Xr'', can then proceed analogous to the equation (3), where Xar becomes Xar' or Xar'' and the measured variable Xa-Xr becomes Xa'-Xr', or Xa''-Xr''.

A suitable development of the inventional device consists in a supplemental processing of the spring travel signal before the electronic filter units and/or computer units 11 and 12. The transfer function according to equation (1) exhibiting a differentiating behavior between the variables P and Xar, it is necessary to safeguard that high-frequency disturbances, for instance greater than 20 Hz, will not be amplified in the measured value of the spring travel signal. This can be accomplished, e.g., through filters of the type of a low-pass filter or by digital processing in computer units through an additional algorithm. Present on the output of the electronic filter units and/or computer units 11 and 12 are thus the signals of the wheel load fluctuation P and its sensitivity P'.

For a more exact description of the means 9 for evaluation of the values, to begin with, a possible control law for the control/regulation of the suspension and/or damping system will be addressed in the following.

A change of the undercarriage characteristic for minimization of the wheel load fluctuations, actually, is meaningful only when a driving situation critical to safety exists. This may be detected, e.g., in that the wheel load fluctuation exceeds by amount a threshold value Pgr, thereby meeting the condition $$|P| > Pgr \quad (7).$$

If this condition is violated, i.e., if no situation critical to safety is on hand, the undercarriage characteristic may remain unchanged, for instance in the tuning "soft" or "hard." In the case of violation of condition (7), however, also the actually existing undercarriage characteristic could remain unchanged in view of other objectives of regulation, for instance in the sense of maximizing the driving comfort.

During a driving situation critical to safety (condition (7) is met), a modification of the undercarriage tuning recommends itself especially when the condition $$|P'| > k^* |P| \quad (8)$$

is met. Moreover, a modification of the undercarriage characteristic toward "hard" is suitable whenever the additional condition $$P^* P' < 0 \quad (9a)$$

is met. Contrarily, if $$P^* P' < 0 \quad (9b)$$

is applicable, a modification toward "soft" is called for.

The variables Pgr and k should be considered as undercarriage tuning parameters and are passed on to input units and 313. The undercarriage tuning parameters may assume constant values either for the controlled/regulated undercarriage or are dependent on variables that influence the driving condition, such as the vehicle speed V, the longitudinal and/or transverse acceleration Al and Aq of the vehicle, respectively, and/or the ambient temperature T.

The meaning of the above three inequalities (7), (8) and (9a,b) can be described graphically. If the stated conditions are met, this fact has the following meaning:

Condition (7)

Adjustment of the spring and/or damping characteristic when the wheel load fluctuation exceeds a certain variable Pgr, that is, the vehicle is in a critical road situation.

Condition (9a,b):

Adjustment of the spring and/or damping characteristic only when the variation effects a reduction of the momentary wheel load fluctuation P. If P is for instance positive, (and according to condition (7) greater than Pgr) and the momentarily adjusted characteristic is for instance "soft," it will be adjusted only toward "hard," if the sensitivity P'is negative; that is, the wheel load fluctuation P diminishes in the case of an increasing characteristic parameter, for instance of the damping constant (harder tuning). If at the point in time considered (momentarily adjusted characteristic "soft") the sensitivity P' is positive, a variation of the tuning toward "hard" would result in an increasing wheel load fluctuation P.

Condition (8):

Adjustment of the spring and/or damping characteristic only when such "pays" in view of improving road safety. That is, that the change of the wheel load fluctuation accomplished through the modification must with regard to the momentary wheel load fluctuation reach a value that can be determined by the value k.

FIGS. 2 and 3 describe the mode of operation of the units 8 and 9 in FIG. 1 in greater detail. Illustrated in FIG. 2 is the case when as momentarily existing undercarriage adjustment the setting "soft" is selected. FIG. 3 illustrates the case when as momentarily existing undercarriage adjustment the setting "hard" is selected. FIGS. 2 and 3 will be described jointly hereafter.

Parameters such as undercarriage tuning parameters Pgr and k, travel speed V, longitudinal and transverse vehicle acceleration Al and Aq, ambient temperature T, numeric set values N1 and N2 and the "reset" time Tr are entered through the input units to 213 and 313.

The variables $P*P'$ and $k*|P|$ required for the control law are formed in multiplier units 214, 314, 215 and 315.

The discriminator units 216, 316, 217, 317, 218 and 318 have the following function:

The discriminator units 216 and 316 compare the variable $|P|$ with the variable Pgr and generate a "Y" signal, if $|P|$ is greater than the variable Pgr, and a signal "N" if $|P|$ is smaller than the variable Pgr.

The discriminator units 217 and 317 compare the variable $P*P'$ with the value 0. The unit 217 generates a "Y" signal if $P*P'$ is smaller than the magnitude 0, and an "N" signal if $P*P'$ is greater than the magnitude 0. The unit 317 generates an "N" signal if $P*P'$ is smaller than the magnitude 0, and a "Y" signal if $P*P'$ is greater than the magnitude 0.

The discriminator units 218 and 318 compare the amount of the variable P' with the variable $k*|P|$. The units 218 and 318 generate a "Y" signal if $|P'|$ is greater than the variable kP, and a signal "N" if $|P'|$ is smaller than the variable kP.

If the output signals of the discriminators 216, 217 and 218 (FIG. 2) respectively 316, 317 and 318 (FIG. 3) simultaneously possess the value "Y", a signal for providing a counting signal is transmitted to the unit 218 (FIG. 2) or 319 (FIG. 3), on the output of which the signal Z1 is then counted in the counters 221 (FIG. 2) or 321 (FIG. 3). If at least one of the discriminators 216, 217 and 218 (FIG. 2) or 316, 317 and 318 (FIG. 3) carries as output signal the value (N), a signal for making a counting signal available is transmitted to the unit 220 (FIG. 2) or 320 (FIG. 3) on the output of which the signal Z2 is then counted in the counter 222 (FIG. 2) or 322 (FIG. 3).

The contents Z1ges and Z2ges of the counters 221 and 222 (FIG. 2) or 321 and 322 (FIG. 3) are transmitted as output signals to the discriminators 224 and 225 (FIG. 2) and 32 and 325 (FIG. 3). Here, the counter contents are compared with set values N1 and N2. Specifically, the counter contents Z1ges and Z2ges are compared with the sum Z1ges plus Z1ges as set value, which is formed by the adding unit 223 (FIG. 2) or 323 (FIG. 3) and transmitted to the discriminators 224 and 225 (FIG. 2) or 324 and 325 (FIG. 3). Additionally, it is advantageous to compare the counter contents Z1ges and Z2ges with one another, as set values in the discriminators 224 and 225 (FIG. 2) or 324 and 325 (FIG. 3). Furthermore, the counter contents can be compared with set values which are determined in contingence on variables effecting the driving condition, such as the travel speed V, longitudinal and transverse vehicle acceleration Al, Aq and/or the ambient temperature T, which are entered in the input units 213 or 313. The counter contents are reset by inputting reset signals in the counters 224 and 225 (FIG. 2) or 324 and 325 (FIG. 3). The reset signals are transmitted to the counter units 224 and 225 (FIG. 2) or 324 and 325 (FIG. 3), for instance after each changeover process of the damping and/or suspension characteristic and/or at certain time intervals Tr and/or contingent on the counter contents and/or variables influencing the driving condition.

If the counter contents Z1ges or Z2ges exceed the determined and/or preselected set values N1 and N2, the signals Y prevail on the outputs of the discriminators 224 and 225 (FIG. 2) or 324 and 325 (FIG. 3). If the counter contents Z1ges or Z2ges fall short of the determined and/or preselected set values, the signals N will be present on the outputs of the discriminators 224 and 225 (FIG. 2) or 324 and 325 (FIG. 3).

A functional option of the discriminators 224 and 225 (FIG. 2) or 324 and 325 (FIG. 3) that is relatively easy to realize is the comparison of the counter contents Z1ges and Z2ges with the numeric set values N1 and N2 per sum Z1ges+Z2ges. The function of the devices 224 and 225 (FIG. 2) or 324 and 325 (FIG. 3) avoids that in road situations where the wheel load fluctuation increases only briefly, without endangering the road safety (for instance crossing a sewer cover), a changeover to another damping and/or suspension characteristic will take place. This increases, for one, the driving comfort without influencing the road safety and, for another, prolongs the service life of the regulable suspension and/or damping system, since mechanical, and thus wearing, actuators are of necessity used here. Reducing the inventional device to practice requires only a single sensor.

The output signals Y of the discriminators 224 and 225 (FIG. 2) or 324 and 325 (FIG. 3) are passed on to the output units 226 and 227 (FIG. 2) or 326 and 327 (FIG. 3), where control signals are generated which are transmitted to the end stage 10 (FIG. 1). If a signal Y exists on the output of the output unit 226 or 327, a control signal for a changeover to a harder damping and/or suspension characteristic is passed to the end stage 10. If a signal Y is on the input of the output unit 227 or 326, a control signal for a changeover to a softer damping and/or suspension characteristic is transmitted to the end stage 10.

Furthermore, the output units 226 and 227 (FIG. 2) or 326 and 327 (FIG. 3) supply an activation signal to the unit 228 or 328 for determination of the next computation cycle. The N signals on the output of the discriminators 224 and 225 (FIG. 2) or 324 and 325 (FIG. 3) are passed as well to the units 228 (FIG. 2) or 328 (FIG. 3) for determination of the next computation cycle. Determined here is the next capturing of the "deaveraged" spring travel Xar in the electronic filter units and/or computer units 211 and 212 or 311 and 312. This occurs in contingence on time and/or variables affecting the driving condition, such as travel speed V, longitudinal and/or transverse vehicle acceleration Al and Aq, respectively, and/or ambient temperature T. Formed in this way are time intervals at the start of which the inventional control/regulation cycle is being passed through. This may for instance be so conceived that at a slow travel speed (for instance parking process) the cycle is being passed through at greater intervals than at high speeds.

An especially simple design of the inventional device can be achieved in that, while bypassing the unit 228 or 328 for determination of the next computation cycle, a new regulation cycle is always started as soon as the previous one is completed. In this case, the computation cycle illustrated in FIG. 2 or FIG. 3 is continually passed through, i.e., the interval lengths are dependent only on the computation time.

The inventional device illustrated for instance on the suspension and/or damping system of a wheel unit is preferably established for each wheel unit of the undercarriage to be controlled/regulated. The changeovers between the damping and/or suspension characteristics occur preferably, for the wheel units of the undercarriage to be controlled/regulated, independently from one another.

Moreover, another development of the inventional device that is especially simple to realize is given when the suspension and/or damping system to be controlled/regulated features only two tuning stages which differ by different values of the characteristic parameters. If the units and discriminators, which in this case are marked 219 through 225 (FIG. 2) or 319 through 325 (FIG. 3) (including) are bypassed (broken line in FIG. 2 and 3) and at least one of the three conditions scanned in steps 216, 217 and 218 (FIG. 2) Or 316, 317 and 318 (FIG. 3) is not met (Signal N on the input of 220 or 320), a switching signal is transmitted to the unit 227 or 327, in response to which a changeover is then taking place to the softer (FIG. 2) or harder (FIG. 3) damping and/or suspension characteristic. A changeover to the harder (FIG. 2) or softer (FIG. 3) damping and/or suspension characteristic takes place if each of the three conditions scanned in steps 216, 217 and 218 (FIG. 2) or 316, 317 and 318 (FIG. 3) is met (signal Y on the input of 219 or 319), by feeding a switching signal to the unit 226 or 327. This design is characterized by minimum expense, since the units marked 219 through 225 (FIG. 2) or 319 through 325 (FIG. 3) are superfluous because the suspension and/or damping system to be controlled/regulated requires only two tuning stages and only a single sensor is needed for capturing the spring deflection movements.

The inventional device is suitably integrated wholly or partly in the suspension or damping system to be controlled/regulated. In this way, a nonproblematic retrofitting of previously conventional, i.e., passive undercarriages is possible, for instance by replacing the passive absorber elements by active ones in which the inventional device is integrated. Such a damping element, compact in design and unlike the conventional elements to be replaced, features only one connection to the electrical onboard network.

Moreover, the inventional device can be used for generating a display signal that is representative of the road safety. This display signal informs for instance as to whether a situation unsafe in terms of driving exists. This then makes it possible to institute measures, which facultatively go beyond the inventional control/regulation of the undercarriage, for increasing the road safety.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of generating signals for controlling an undercarriage of a motor vehicle, the motor vehicle having sequences of motion which are controllable, and including a vehicle body, at least two wheel units and at least one of a suspension system and damping system for influencing movements between the wheel unit and the vehicle body, said method comprising the steps of:
   sensing relative movements between the wheel units and the vehicle body;
   providing signals representing said sensed relative movements;
   calculating a wheel load fluctuation based on said provided signals;
   precalculating possible changes (P') of the wheel load fluctuation (P) as a function of possible changes of an undercarriage characteristic;
   scanning selected criteria to determine whether a driving condition critical to road safety exists; and
   adjusting the undercarriage characteristic for minimization of the wheel load fluctuations when said scanning step determines a driving condition critical to road safety.

2. The method of claim 1, further comprising the steps of multiplying together at lest one of the wheel load fluctuation (P), the possible changes of the wheel load fluctuation (P') and read-in variables, said read-in variables comprising at least have variables Pgr and k representing undercarriage tuning parameters; comparing the multiplied values and read-in variables; and adjusting the suspension adjusting and damping system based on results of the comparison.

3. The method of claim 2, wherein said multiplying step comprises multiplying said wheel load fluctuation (P), changes of the wheel load fluctuation (P'), and read-in variables together according to equations P*P' and k*|P|; and said comparing step comprises comparing the value of P*P' and k*|P| with the variables 0, |P'|, Pgr and |P|, and, in the case of a momentarily adjusted softer undercarriage tuning, performing the comparisons according to the first three informational equations;

$|P| > Pgr$ $P \cdot P' < 0$ $|P=| > k^* |P|$ and, in the case of a momentarily adjusted harder undercarriage tuning, performing the comparisons according to the second three informational equations $|P| > Pgr$ $P \cdot P' > 0$ $|P'| > k^* |P|,$ said comparisons performed at time intervals whose lengths are selective;
  determining a boolean result (Y or N) depending on whether each of the first or second three informational equations is met (value Y) or one of the first or second three informational equations is met (value N);
  counting the values (Y and N);
  comparing the number of counted values A(Y) and A(N) with stored values; and
  adjusting the suspension and damping system when A(Y) or A(N) exceed the stored values, specifically allowing for variables influencing the driving condition.

4. The method of claim 1, wherein said provided signals comprise a plurality of undercarriage tuning parameters which respectively assume a constant value or are dependent on variables that influence the driving condition, said variables influencing the driving condition including at least one of travel speed, longitudinal vehicle acceleration, transverse vehicle acceleration and ambient temperature.

5. The method of claim 3, comprising the further step of selecting the time interval lengths based on at least one of control cycle times, regulating cycle times and variables influencing the driving condition, said variables influencing the driving condition including at least one of vehicle speed, longitudinal vehicle acceleration, transverse vehicle acceleration, and ambient temperature.

6. The method of claim 1, wherein said provided signals represent at least one of spring deflection travel (Xa-Xr), spring deflection velocity (Xa'-Xr'), and spring deflection acceleration (Xa''-Xr''), comprising the further steps of:
  calculating, in the case of the determined signal (Xa-Xr), a deaveraged spring travel (Xar) from the signal (Xa-Xr) by subtraction of the current average of the signal (Xa-Xr) as $Xar(t) = \{Xa(t) - Xr(t)\} - \left\{ 1/Tm^* \int_{t-Tm}^{t} [Xa(r) - Xr(r)] dr \right\},$ where Tm is an undercarriage tuning parameter and t is the actual point in time, and where from a "deaveraged" spring travel (Xar) the wheel load fluctuation P is calculated according to the transfer function $-[1+Mr/Ma)^*C + (1+Mr/Ma)^* d^*s + Mr^*s^2],$ the sensitivity $\partial P/\partial d$ of the wheel load fluctuation with regard to the damping constant d by the transfer function $-(Ma^*Cr^*s^3)/D(s)$ and the sensitivity $P/C$ of the wheel load fluctuation with regard to the spring stiffness C by the transfer function $-(Ma^*Cr^*s^2)/D(s)$ is determined, where s is the Laplace variable and $D(s) = C^*Cr + Cr^*d^*s + (C^*Mr + (C+Cr)$
$^*Ma)^*s^2 + (Ma+Mr)^*d^*s^3 + Ma^*Mr^*s^4$ and C, Cr spring stiffnesses, Ma the mass of the vehicle body, Mr the mass of the wheel and d the damping constant; and
calculating, in the case of the determined signal representing the spring deflection velocity (Xa'-Xr'), from the pertaining "deaveraged" signal Xar', the wheel load fluctuation P according to the transfer function $-[1/s]^*$
$[(1+Mr/Ma)^*C + (1+Mr/Ma)^*d^*s + Mr^*s^2],$ the sensitivity $\partial P/\partial d$ of the wheel load fluctuation as regards the damping constant d by the transfer function $-[(Ma^*Cr^*s^2)/D(s)]$ and the sensitivity $\partial P/\partial C$ of the wheel load fluctuation as regards the spring stiffness C by the transfer function $-[(Ma^*Cr^*s)/D(s)],$ where s is the Laplace variable and $D(s) = C^*Cr + Cr^*d^*s + (C^*Mr + (C+Cr)^*Ma)^*s^2 + (Ma+Mr)^*d^*s^3 + Ma^*Mr^*s^4$ and C, Cr are the spring stiffnesses, Ma is the mass of the vehicle body, Mr the mass of the wheel and d the damping constant; and
calculating, in the case of the determined signal representing the spring deflection acceleration (Xa''-Xr''), from the pertaining "deaveraged" signal Xar the wheel load fluctuation P according to the transfer function $-[1/s^2]$
$^*[(1+Mr/Ma)^*C + (1+Mr/Ma)^*d^*s + Mr^*s^2],$ the sensitivity $\partial P/\partial d$ of the wheel load fluctuation with regard to the damping constant d by the transfer function $-[(Ma^*Cr^*s)/D(s)]$ and the sensitivity ∂P/∂C of the wheel load fluctuation as regards the spring stiffness C by the transfer function −[(Ma*Cr)/D(s)], where s is the Laplace variable and $D(s) = C*Cr + Cr*d*s + (C*Mr + (C+Cr)*Ma)*s^2 + (Ma+Mr)*d*s^3 + Ma*Mr*s^4$ and C, Cr are spring stiffnesses, Ma is the mass of the vehicle body, Mr the mass of the wheel and d the damping constant.

7. The method of claim 1, wherein said adjustment affects only one wheel unit.

8. The method of claim 1, comprising the further step of filtering out provided signals above the frequency range of about 20 Hz.

9. The method of claim 1, wherein said adjusting step is carried out in cycles, a new adjusting cycle being started as soon as the previous one is completed.

10. The method of claim 1, wherein said sensing step comprises using at least one sensor per wheel unit of the vehicle for indirectly or directly sensing at least one of spring deflection travel, spring deflection velocity, and spring deflection acceleration.

11. The method of claim 1, wherein the undercarriage tuning parameters respectively assume a constant value or are dependent on variables that influence the driving condition, said variables influencing the driving condition including at least one of travel speed, longitudinal vehicle acceleration, transverse vehicle acceleration and ambient temperature.

12. The method of claim 2, wherein said undercarriage tuning parameters respectively assume a constant value or are dependent on variables that influence the driving condition, said variables influencing the driving condition including at least one of travel speed, longitudinal vehicle acceleration, transverse vehicle acceleration an ambient temperature.

13. The method of claim 3, wherein the time interval lengths are selected based on at least one of control cycle times, regulating cycle times and variables influencing the driving condition, said variables influencing the driving condition including at least one vehicle speed, longitudinal vehicle acceleration, transverse vehicle acceleration and ambient temperature.

14. A system for generating signals for controlling an undercarriage of a motor vehicle, the motor vehicle having sequences of motion which are controllable, and including a vehicle body, at least two wheel units and at least one of a suspension system and damping system for influencing movements between said wheel unit and said vehicle body, the suspension and damping system including a spring between the vehicle body and the wheel unit, said system for generating signals for controlling an undercarriage of a motor vehicle comprising:

a sensor providing signals representing relative movements between the wheel units and the vehicle body;

value determination means for inferring a wheel load fluctuation (P) based on the sensed signals, and precalculating possible changes (P') of the wheel load fluctuation (P) as a function of possible changes of an undercarriage characteristic;

evaluation means for scanning certain criteria to determine whether a driving condition critical to road safety exists; and an end stage for adjusting the undercarriage characteristic for minimization of the wheel load fluctuations when said evaluation means determines a driving condition critical to road safety.

15. The system of claim 14, wherein at least one of the suspension and damping systems adjust the undercarriage characteristic in at least two stages, at least one of said suspension and damping systems having at least two undercarriage tuning parameters.

16. The system of claim 14, wherein said sensor comprises at least one sensor per wheel unit for indirectly or directly sensing at least one of a spring deflection travel, spring deflection velocity, and spring deflection acceleration.

17. The system of claim 14, wherein said system is wholly or partly integrated in said at least one suspension and damping system.

* * * * *

UNITED STATES PATENT AND TRADEMARK OFFICE
CERTIFICATE OF CORRECTION

PATENT NO. : 5,267,161
DATED : November 30, 1993
INVENTOR(S) : Rainer Kallenbach, et al It is certified that error appears in the above-identified patent and that said Letters Patent is hereby corrected as shown below:

Claim 2, column 10, line 53, delete "lest" and insert therefor --least--.

Claim 2, column 10, line 56, delete "have" and insert therefor --the--.

Claim 3, column 11, line 6, delete "P=" and insert therefor --P'--.

Signed and Sealed this

Twenty-sixth Day of April, 1994

Attest:

BRUCE LEHMAN

Attesting Officer     Commissioner of Patents and Trademarks